(12) United States Patent
Eriksen et al.

(10) Patent No.: US 10,145,362 B2
(45) Date of Patent: Dec. 4, 2018

(54) TRANSPORTATION OF A DIRECT DRIVE GENERATOR

(71) Applicant: SIEMENS AKTIENGESELLSCHAFT, München (DE)

(72) Inventors: Uffe Eriksen, Horsens (DK); Peder Hykkelbjerg Hansen, Silkeborg (DK); Henrik Anton Jensen, Ikast (DK)

(73) Assignee: SIEMENS AKTIENGESELLSCHAFT (DE)

( * ) Notice: Subject to any disclaimer, the term of this patent is extended or adjusted under 35 U.S.C. 154(b) by 436 days.

(21) Appl. No.: 14/655,481

(22) PCT Filed: Dec. 23, 2013

(86) PCT No.: PCT/EP2013/077872
§ 371 (c)(1),
(2) Date: Jun. 25, 2015

(87) PCT Pub. No.: WO2014/106601
PCT Pub. Date: Jul. 10, 2014

(65) Prior Publication Data
US 2015/0361963 A1    Dec. 17, 2015

(30) Foreign Application Priority Data
Jan. 7, 2013 (EP) .................................. 13150378

(51) Int. Cl.
*B64C 27/00* (2006.01)
*F03D 11/00* (2006.01)
(Continued)

(52) U.S. Cl.
CPC ............ *F03D 11/0058* (2013.01); *F03D 9/25* (2016.05); *F03D 13/10* (2016.05); *F03D 13/40* (2016.05);
(Continued)

(58) Field of Classification Search
CPC .. F03D 13/40; F03D 9/30–9/32; F03D 13/00; F05B 2220/7066; F05B 2240/94;
(Continued)

(56) References Cited

U.S. PATENT DOCUMENTS

2007/0036655 A1    2/2007  Damgaard et al.
2010/0013239 A1*   1/2010  Damgaard .............. F03D 1/001
                                                              290/55
(Continued)

FOREIGN PATENT DOCUMENTS

CN    1759243 A    4/2006
CN    202 550 828 U    11/2012
(Continued)

OTHER PUBLICATIONS

International Search Report and Written Opinion for PCT Application No. PCT/EP2013/077872, dated Apr. 10, 2014.
International Search Report for PCT Application No. PCT/EP2013/077872, dated Apr. 10, 2014.
Chinese language Office Action and its English translation for Chinese Application No. 201380069678.9, dated Mar. 31, 2017.

*Primary Examiner* — Jun Yoo
(74) *Attorney, Agent, or Firm* — Schmeiser, Olsen & Watts, LLP

(57) ABSTRACT

A method of handling a direct drive generator of a wind turbine is provided. The direct drive generator comprises a stator and a rotor concentrically arranged about an axis of the direct drive generator. The method includes steps of placing the direct drive generator on a support structure, fixing a selected one of the stator or the rotor to the support structure, connecting actuator means to a remaining one of the stator or the rotor, and rotating the remaining one of the stators or the rotor using the actuator means.

9 Claims, 2 Drawing Sheets

(51) Int. Cl.
    *F03D 15/20*        (2016.01)
    *H02K 15/00*        (2006.01)
    *F03D 80/80*        (2016.01)
    *F03D 9/25*         (2016.01)
    *F03D 13/10*        (2016.01)
    *F03D 13/40*        (2016.01)

(52) U.S. Cl.
    CPC ............ *F03D 15/20* (2016.05); *F03D 80/82* (2016.05); *F03D 80/88* (2016.05); *H02K 15/00* (2013.01); *F05B 2220/7066* (2013.01); *Y02E 10/725* (2013.01); *Y10T 29/49828* (2015.01)

(58) Field of Classification Search
    CPC ............ F05B 2240/941; F05B 2260/79; F05B 2260/76
    See application file for complete search history.

(56) References Cited

U.S. PATENT DOCUMENTS

| | | |
|---|---|---|
| 2011/0138626 A1 | 6/2011 | Tirumalai et al. |
| 2012/0074707 A1* | 3/2012 | Pedersen .............. H02K 7/1838 290/55 |

FOREIGN PATENT DOCUMENTS

| | | |
|---|---|---|
| DE | 33 44 449 A1 | 11/1984 |
| DE | 10 2011 017801 A1 | 10/2012 |
| EP | 1 611 351 B1 | 1/2006 |
| EP | 1733143 B1 | 5/2011 |
| EP | 2 395 240 A1 | 12/2011 |

* cited by examiner

TRANSPORTATION OF A DIRECT DRIVE GENERATOR

CROSS-REFERENCE TO RELATED APPLICATIONS

This application claims priority to PCT Application No. PCT/EP2013/077872 having a filing date of Dec. 23, 2013, based off of EP 13150378.1 having a filing date of Jan. 7, 2013, the entire contents of which are hereby incorporated by reference.

FIELD OF TECHNOLOGY

The following relates to a method of handling a direct drive generator of a wind turbine and an assembly for handling a direct drive generator of a wind turbine.

BACKGROUND

With the increasing demand for renewable energies the typical rated output powers of wind turbines have been growing for many years. The greater output power leads to corresponding increases in the size and weight of the various parts of the wind turbines. Thus, transportation of the parts of the wind turbines has become increasingly difficult. It has been found that rotatable parts of the wind turbines such as bearing may be damaged during transport or storage because of the enormous weight of the individual components. The damage typically shows as stand still marks where the weight of one component causes deformations to itself or an underlying part. One such part of a wind turbine that may be difficult to handle is a direct drive generator.

SUMMARY

An aspect relates to a method of handling a direct drive generator of a wind turbine. The direct drive generator comprises a stator and a rotor concentrically arranged about an axis of the direct drive generator. The method includes steps of:
  placing the direct drive generator on a support structure;
  fixing a selected one of the stator or the rotor to the support structure;
  connecting actuator means to a remaining one of the stator or the rotor; and
  rotating the remaining one of the stator or the rotor using the actuator means.

Embodiments of the invention avoid stand still marks by constantly moving or rotating the inner part of the direct drive generator during handling. It should be noted that "rotating" does not necessarily mean rotating the inner part of the direct drive generator by one or more complete revolutions but also motions over only a segment of a circle, e.g. forth and back movements. For example, the outer part of the direct drive generator may rest on the support structure and thereby effectively shields the inner part from any contact with the support structure which may cause damages to the inner part. In this case, the inner part of the direct drive generator will be rotated during handling. Furthermore, since the outer part of the direct drive generator does not move relative to the support structure, the outer part will not be damaged either. Thus, the inventive method protects the direct drive generator against damages from stand still marks and from impacts during handling. In addition, health and safety risks are eliminated by rotating the inner one of the stator or the rotor because the rotating parts are embedded by the outer one of the stator or the rotor which is fixed to the support structure.

However, in another preferred embodiment of the method of the invention, inner one of the rotor or the stator is fixed to the support structure while the outer one of the rotor or the stator is rotated during handling. The inner one of the rotor or the stator may be fixed to the support structure by means of a flange or the like that is accessible from the outside of the direct drive generator. The inner one of the rotor or the stator may be propped holding the direct drive generator in such a way that the outer one of the rotor or the stator may be rotated without the support structure interfering. Rotating the outer one is especially useful if the outer one is the rotor of the direct drive generator and the inner one is the stator because the rotor is designed for rotating while the stator may comprise ports or connectors for lubricants for a bearing of the direct drive generator which may be connected to a lubricant reservoir and/or pump included in the support structure. Furthermore, rotating the outer one (e.g. rotor of the direct drive generator) is especially useful when the direct drive generator is already installed within a nacelle of a wind turbine and the direct drive generator and the nacelle are handled together. The nacelle effectively shields the rotor which means that the rotor cannot be damaged or cause damage or harm when rotating during handling.

Preferably, selected one of the stator or the rotor is the stator of the direct drive generator and the remaining one of the stator or the rotor is the rotor of the direct drive generator. The advantage is that the rotor of the direct drive generator is designed for rotation anyway and, as already mentioned above, the stator may comprise ports and connectors that may be connected to suitable means in the support structure used during handling. Furthermore, the direct drive generator may be handled together with a hub connected to it. In such a case the step of connecting actuator means to the rotor can be carried out by connecting the actuator means to the hub in such a way that the rotor will be rotated by means of rotating the hub.

Preferably, the remaining one of the stator or the rotor is rotated back and forth. As already explained above, such smaller movements are sufficient for avoiding stand still marks. However, rotating the remaining part of the direct drive generator back and forth can be accomplished by less complex means such as a hydraulic cylinder which can expand and contract. The linear motion of the hydraulic cylinder will then be transformed into a rotational movement by the inner part of the direct drive generator. Furthermore, only a relatively small extension and contraction of the actuator means/hydraulic cylinder will be required for a back and forth motion as compared to rotating the remaining one by a plurality of full rotations during handling.

The step of rotating may include rotating the remaining one of the stator or the rotor during a first time interval and not rotating the remaining one of the stator or the rotor during a second time interval following the first time interval. This procedure can be repeated such that the remaining one of the stator or the rotor is periodically moved thus avoiding stand still marks, for example, the remaining one of the stator or the rotor can be rotated for some seconds every ten minutes thus reducing power consumption. The length of the time intervals can be chosen depending on the situation. For example, the rotation can be constantly carried out during e.g. transportation by train while it may be carried out in intervals while being transported on a truck. Furthermore, the length of the time intervals can be chosen depending on the availability of an external power supply for the actuator means, i.e. rotation may be carried out constantly or with relatively shorter pauses when such a power supply is available and with relatively longer pauses when such a power supply is unavailable.

The method may further comprise connecting the actuator means to the support structure. The connection to the support structure provides a pivotal point for the actuator means.

The method may further comprise hoisting the support structure with the direct drive generator onto transportation means. The support structure may then be transported together with the direct drive generator while rotating the inner one of the stator or the rotor. Alternatively, the support structure may be stored together with the direct drive generator while rotating the inner one of the stator or the rotor. Transportation and storing are the most relevant ways of handling the direct drive generator.

A second aspect of the invention relates to an assembly for handling a direct drive generator of a wind turbine. The direct drive generator comprises a stator and a rotor concentrically arranged about an axis of the direct drive generator. The assembly includes a support structure adapted to carry the direct drive generator and actuator means adapted to rotate one of the stator or the rotor of the direct drive generator.

In a preferred embodiment of the invention, the actuator means are connected to the support structure. Preferably the actuator means comprise a hydraulic cylinder.

BRIEF DESCRIPTION

Some of the embodiments will be described in detail, with reference to the following figures, wherein like designations denote like members, wherein.

DETAILED DESCRIPTION

Figure 1:
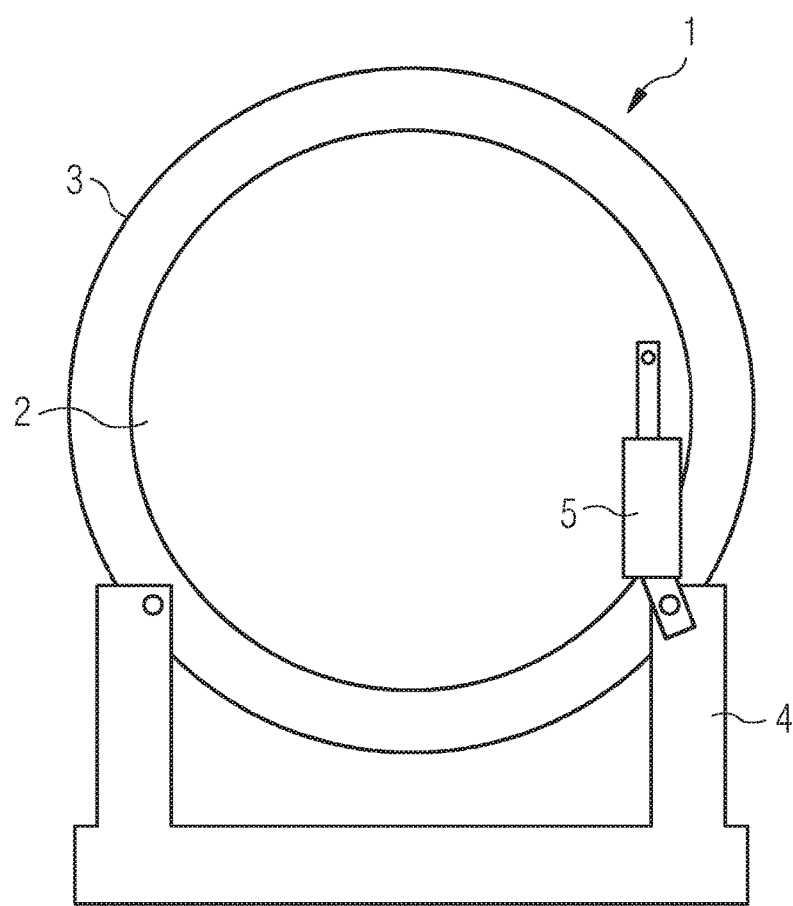
FIG. 1 shows a direct drive generator arranged on a support structure according to a first embodiment.

FIG. 1 shows a direct drive generator 1 arranged on a support structure 4. An outer rotor 3 of the direct drive generator 1 is fixed to the support structure 4 for handling. Thus, the outer rotor 3 cannot move relatively to the support structure 4 thereby avoiding damages to the outer rotor 3 such as scratch marks. Actuator means 5, e.g. a hydraulic cylinder, are connected to an inner stator 2 of the direct drive generator 1. The actuator means 5 of the embodiment shown in FIG. 1 could also be connected to the outer rotor 3 instead of the support structure 4, however, connection of the actuator means 5 to the support structure 4 is preferred because the support structure 4 provides more space for suitable connection means than the relatively thin rim of the outer rotor 3. The actuator means 5 rotate the inner stator 2 relatively to the outer rotor 3 to avoid the generation of stand still marks. The invention may be equally used for direct drive generators having an outer stator and an inner rotor. In this case a first end of the actuator means 5 will connect to the inner rotor and a second end of the actuator means 5 will connect to the outer stator or the support means 4.

Figure 2:
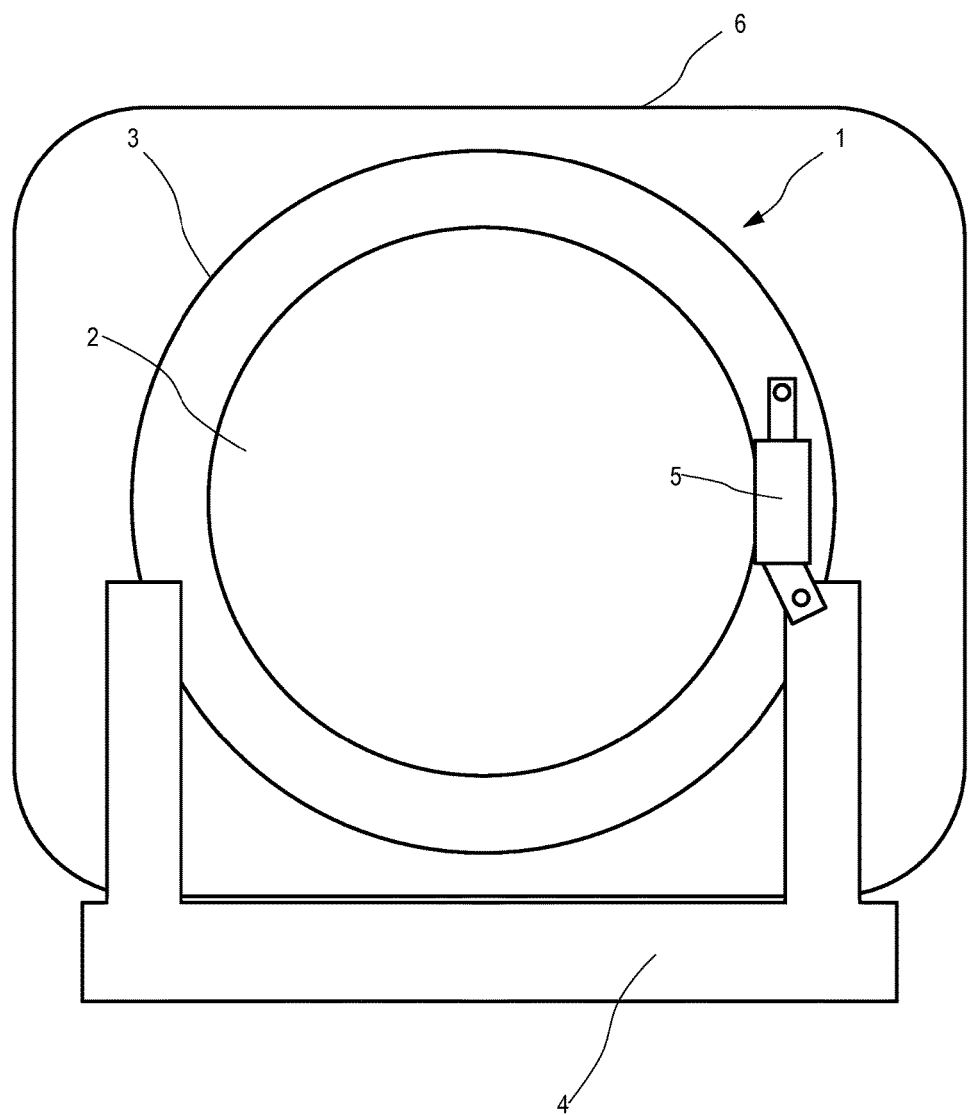
FIG. 2 shows a direct drive generator installed within a nacelle arranged on a support structure according to a second embodiment.

FIG. 2 shows a direct drive generator 1 installed within a nacelle 6 arranged on a support structure 4 which are handled according to a second embodiment of the method of the invention. Here the actuator means 5 are connected to the outer rotor 3 of the direct drive generator 1. The inner stator 2 may be fixed to the support structure 4. For example, the inner stator 2 may be fastened to the support structure 4 by means of nuts and bolts that extend through corresponding borings in the support structure 4 and a flange of the inner stator 2. The nacelle 6 may rest on the support structure 4 or may be affixed to it.

The invention has an advantage that handling of the direct drive generator 1 e.g. for storing or transportation does not cause any damages to the direct drive generator 1.

The present invention has been described with respect to exemplary embodiments thereof which serve as illustrative examples of the invention. However, although specific embodiments have been described to explain the invention, deviations from these embodiments are possible. Hence, the scope of the invention shall not be limited by the described exemplary embodiments but only by the appended claims.

The invention claimed is:

1. A method of handling a direct drive generator of a wind turbine, the direct drive generator comprising a stator and a rotor concentrically arranged about an axis of the direct drive generator, wherein the method comprises:
    placing the direct drive generator on a support structure;
    fixing a selected one of the stator or the rotor to the support structure;
    connecting an actuator means to a remaining one of the stator or the rotor; and
    rotating the remaining one of the stator or the rotor using the actuator means;
wherein the remaining one of the stator or the rotor is rotated back and forth.

2. The method of the claim 1, wherein the selected one of the stator or the rotor is an inner one of the stator or the rotor and wherein the remaining one of the stator or the rotor is an outer one of the stator or the rotor.

3. The method of claim 2, wherein the support structure is transported together with the direct drive generator while rotating the outer one of the stator or the rotor.

4. The method of claim 2, wherein the support structure is stored together with the direct drive generator while rotating the outer one of the stator or the rotor.

5. The method of claim 1, wherein the selected one of the stator or the rotor is the stator of the direct drive generator and wherein the remaining one of the stator or the rotor is the rotor of the direct drive generator.

6. The method of claim 1, wherein the remaining one of the stator or the rotor is rotated back and forth.

7. The method of claim 1, wherein the step of rotating includes rotating the remaining one of the stator or the rotor during a first time interval and not rotating the remaining one of the stator or the rotor during a second time interval following the first time interval.

8. The method of claim 1, further comprising connecting the actuator means to the support structure.

9. The method of claim 1, further comprising hoisting the support structure with the direct drive generator onto a transportation means.

* * * * *